United States Patent
MacKelvie

(10) Patent No.: US 10,816,272 B2
(45) Date of Patent: Oct. 27, 2020

(54) HEAT EXCHANGERS THAT SAVE ENERGY BY HEAT EXCHANGE BETWEEN A FRESH LIQUID AND WASTE FLUIDS

(71) Applicant: Winston MacKelvie, Knowlton (CA)

(72) Inventor: Winston MacKelvie, Knowlton (CA)

( * ) Notice: Subject to any disclaimer, the term of this patent is extended or adjusted under 35 U.S.C. 154(b) by 114 days.

(21) Appl. No.: 16/019,765

(22) Filed: Jun. 27, 2018

(65) Prior Publication Data

US 2020/0003496 A1    Jan. 2, 2020

(51) Int. Cl.
*F28D 7/10* (2006.01)
*F28F 27/02* (2006.01)
*F28D 21/00* (2006.01)
*E03C 1/00* (2006.01)

(52) U.S. Cl.
CPC .......... *F28D 7/10* (2013.01); *F28D 21/0012* (2013.01); *F28F 27/02* (2013.01); *E03C 2001/005* (2013.01); *Y02B 30/56* (2013.01)

(58) Field of Classification Search
CPC .. E03C 2001/005; F24D 17/0005; F28D 7/10; F28D 7/106; F28D 21/0007; F28D 21/0012; F28F 1/003; Y02B 30/18; Y02B 30/566

See application file for complete search history.

(56) References Cited

U.S. PATENT DOCUMENTS

| | | | |
|---|---|---|---|
| 2001/0004009 A1* | 6/2001 | MacKelvie | F24D 17/0005 165/47 |
| 2008/0000616 A1* | 1/2008 | Nobile | F24D 17/0005 165/47 |
| 2009/0090500 A1* | 4/2009 | Damsleth | F16L 53/32 166/57 |
| 2010/0132403 A1* | 6/2010 | MacKelvie | F24D 17/0005 62/515 |
| 2012/0318483 A1* | 12/2012 | Cosby | F28F 13/06 165/109.1 |
| 2013/0306290 A1* | 11/2013 | MacKelvie | F28F 1/00 165/181 |

* cited by examiner

*Primary Examiner* — Eric S Ruppert
*Assistant Examiner* — Hans R Weiland

(57) ABSTRACT

An apparatus to preferentially temper a liquid (only heat it, or, only cool it) by heat exchange with a fluid of indeterminate temperature. A tank of the liquid is plumbed to a liquid dispenser such as a water faucet, heater or chiller and has a internal heat exchanger sealed through each end. A drainpipe with a slit sleeve for double-wall safety, passes through the housing with an annular space between and is connected to a supply of fluids. A gasket seals the space forming a conduit for the liquid. One end of the housing extends from the tank for the liquid inlet. The conduit has natural convection holes into the tank controlled by convection valves which are moved by convection allowing convection only in the direction which preferentially tempers the liquid in the tank, regardless of the temperature, volume, rate, and time of flow of fluids.

6 Claims, 10 Drawing Sheets

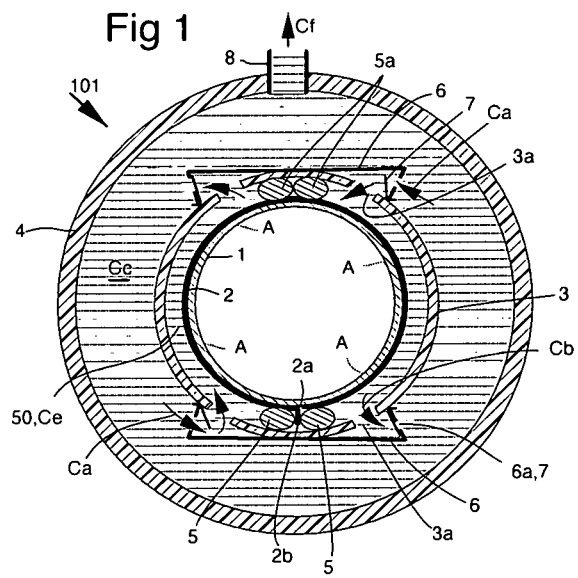
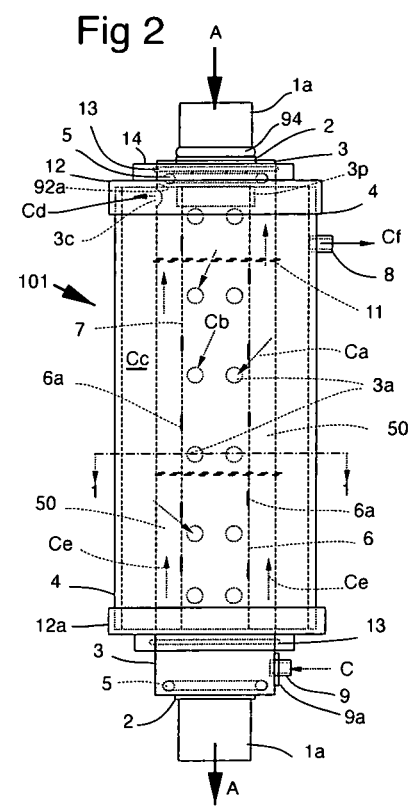
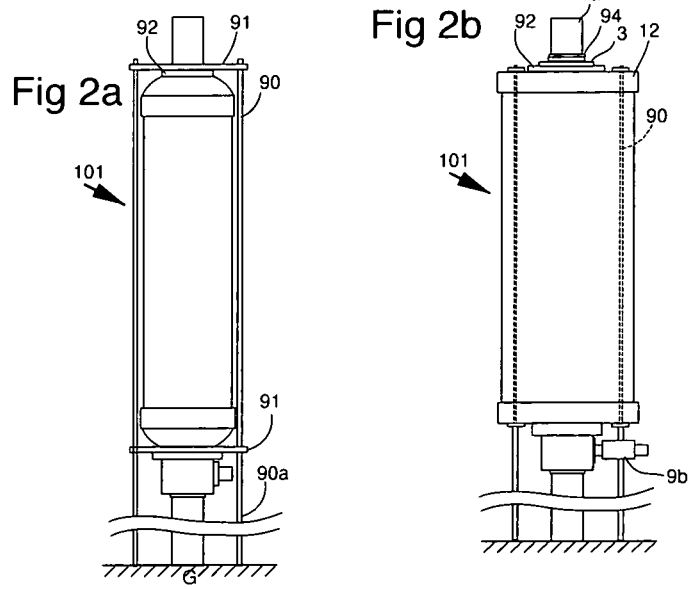

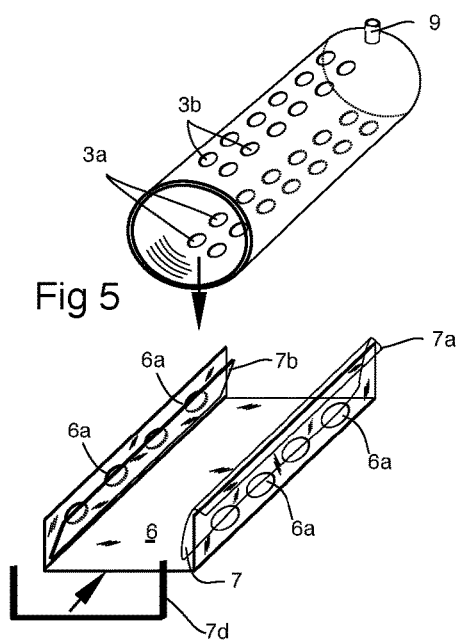
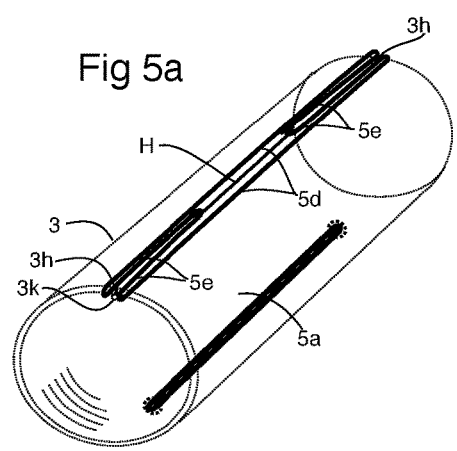
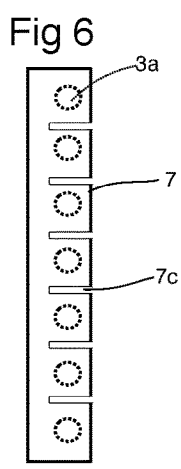
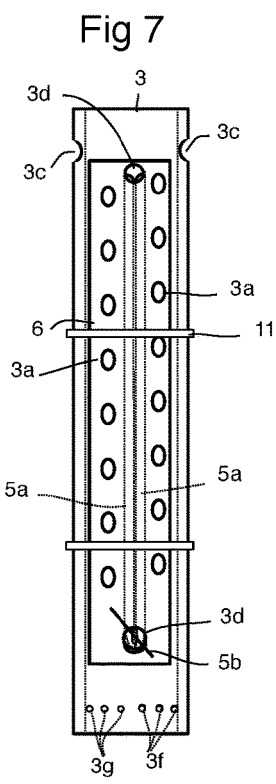
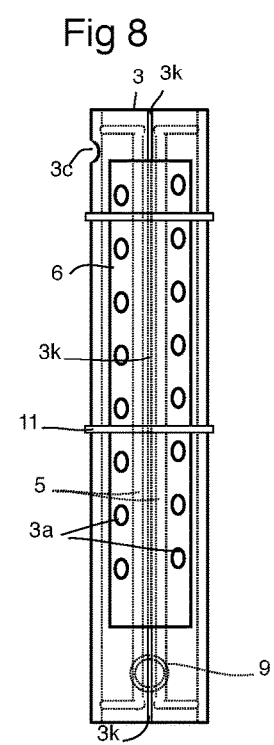

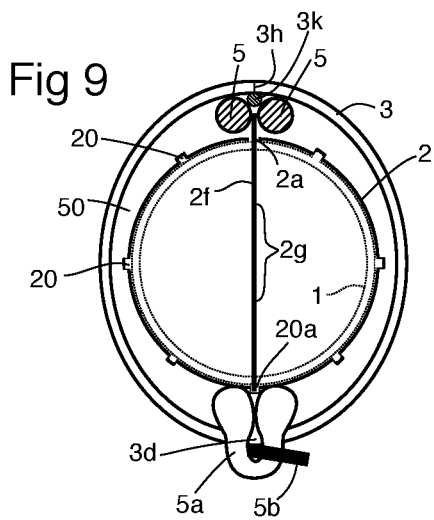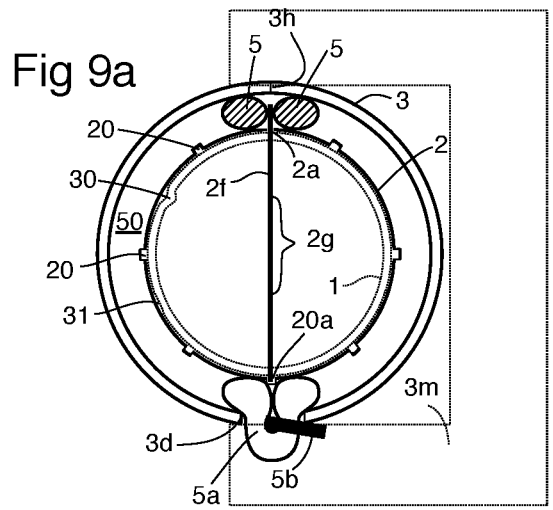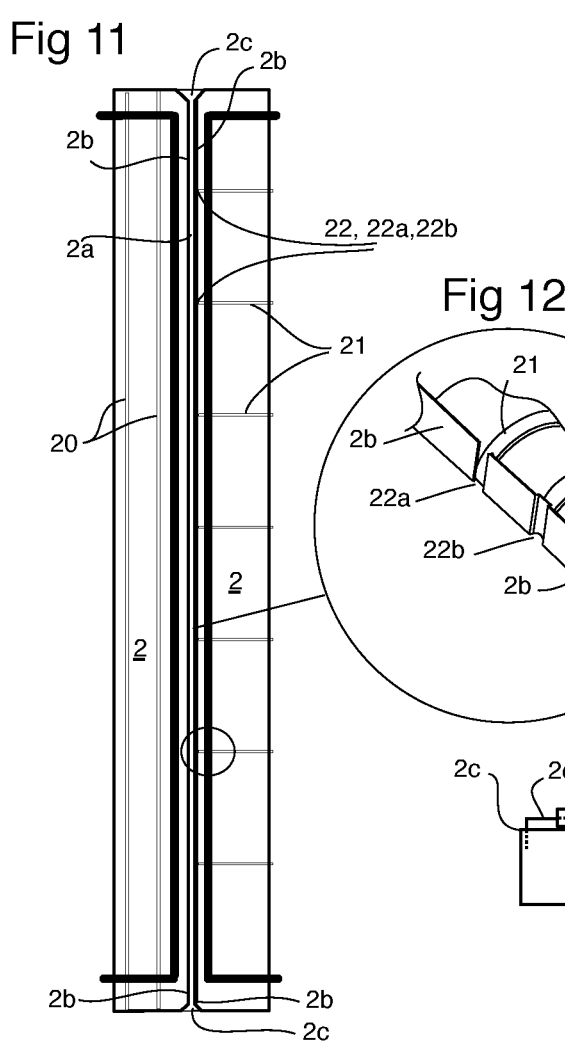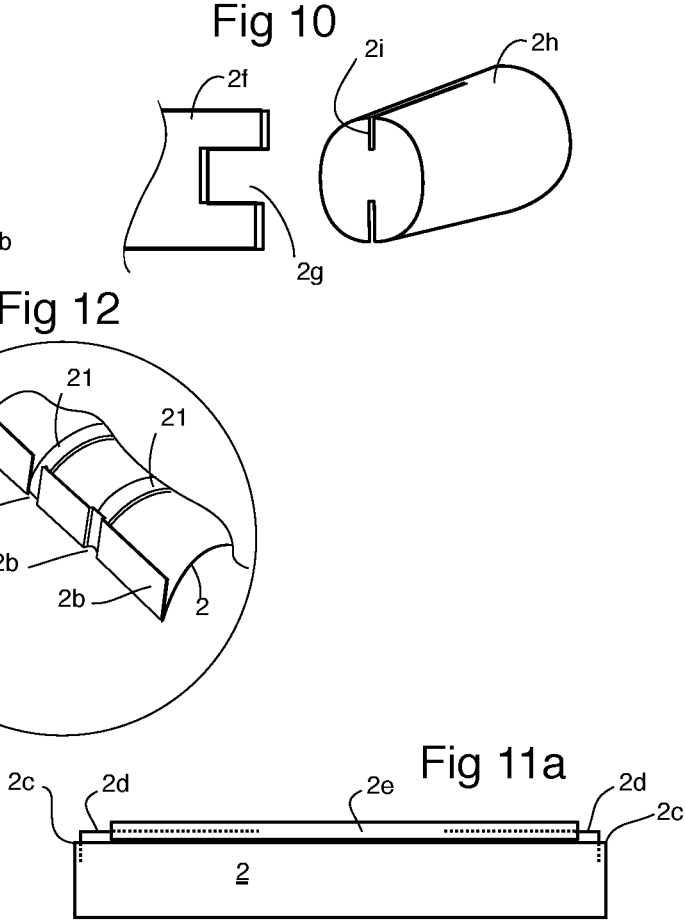

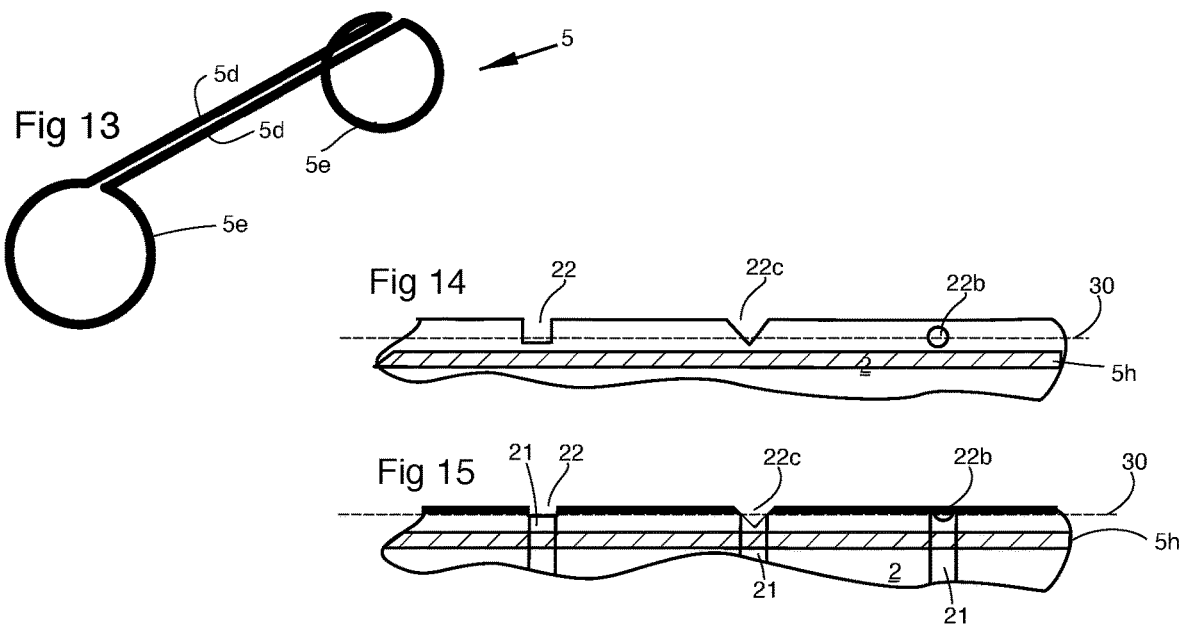
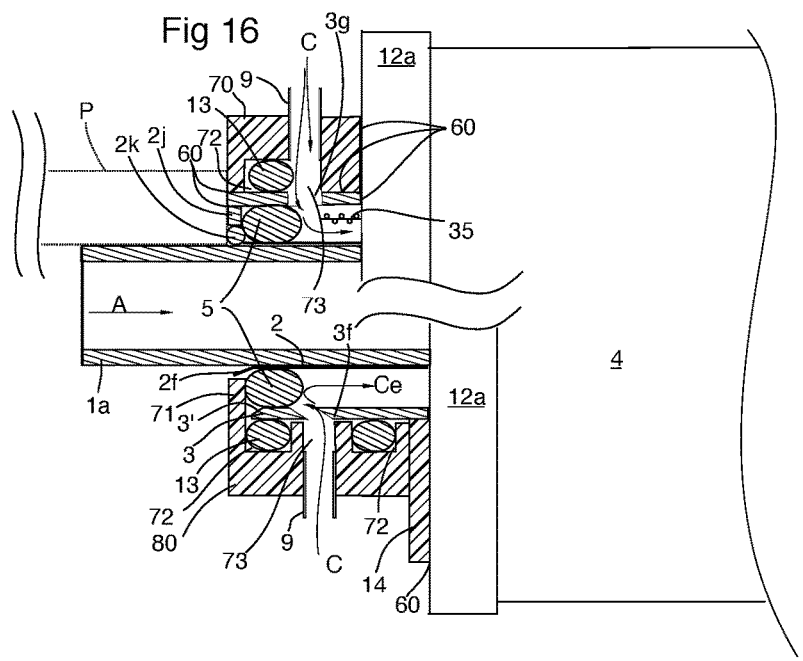

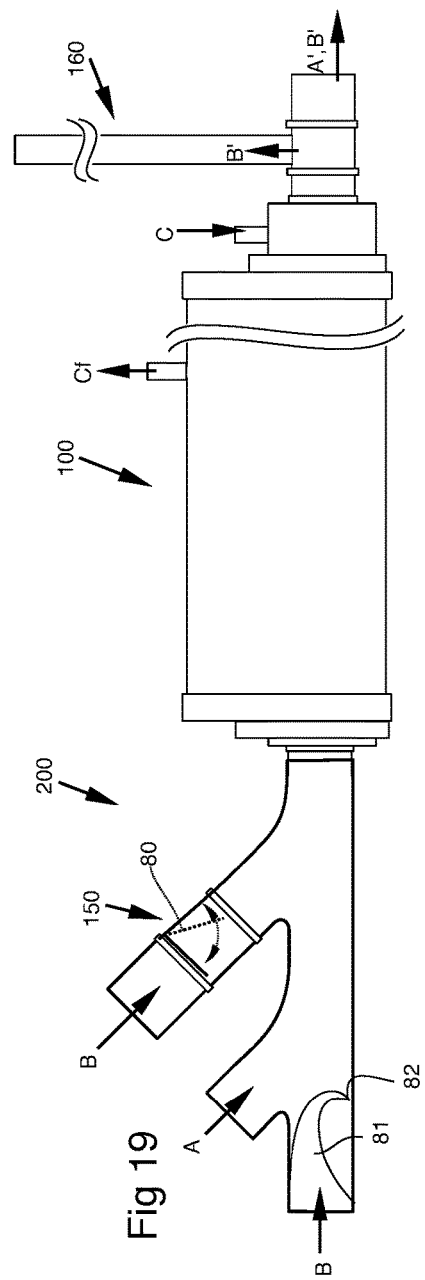
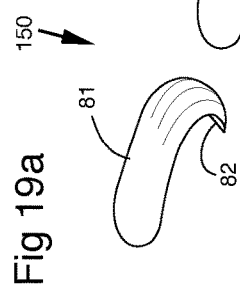
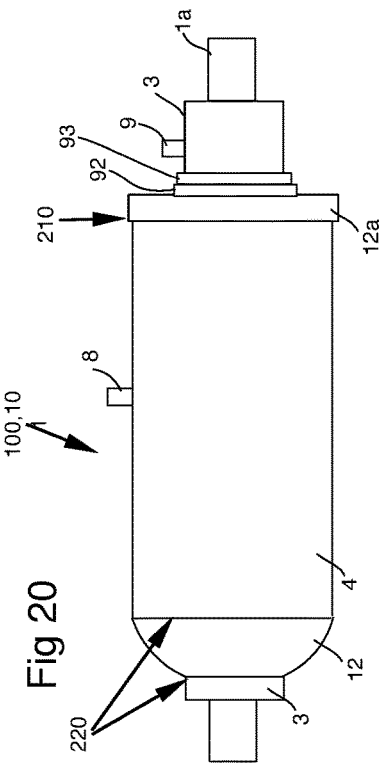

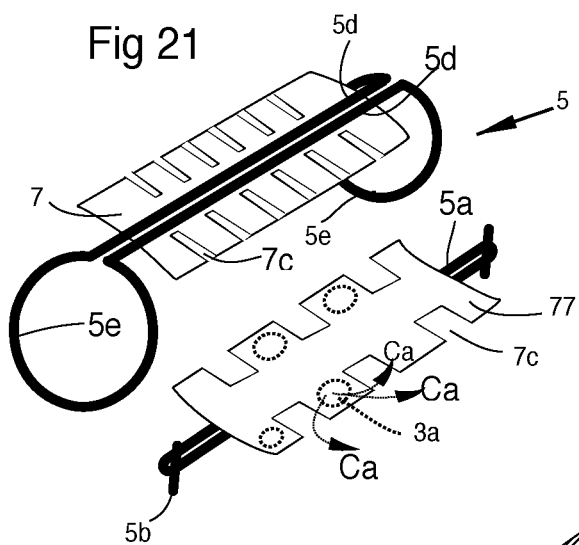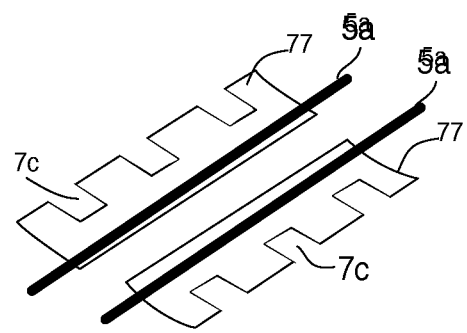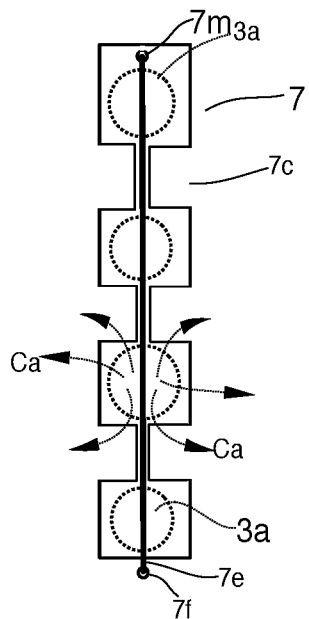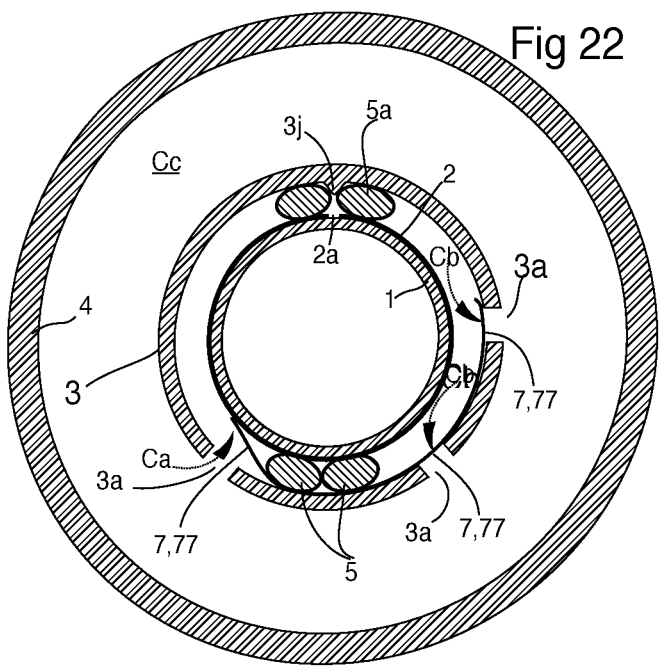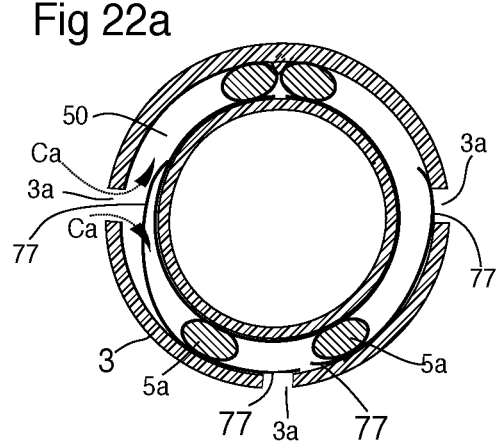

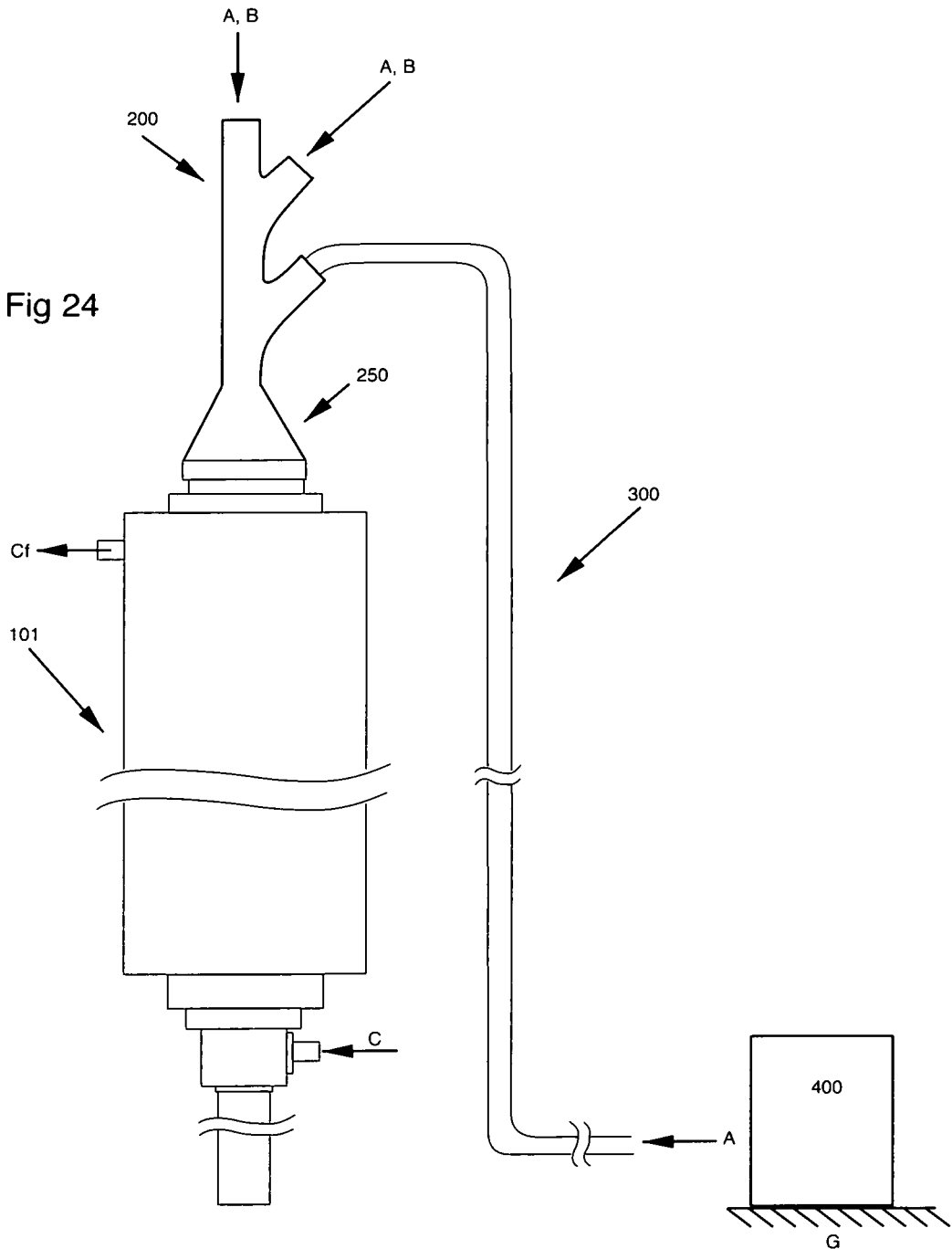

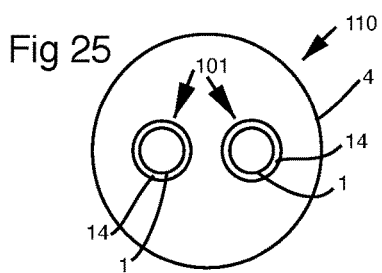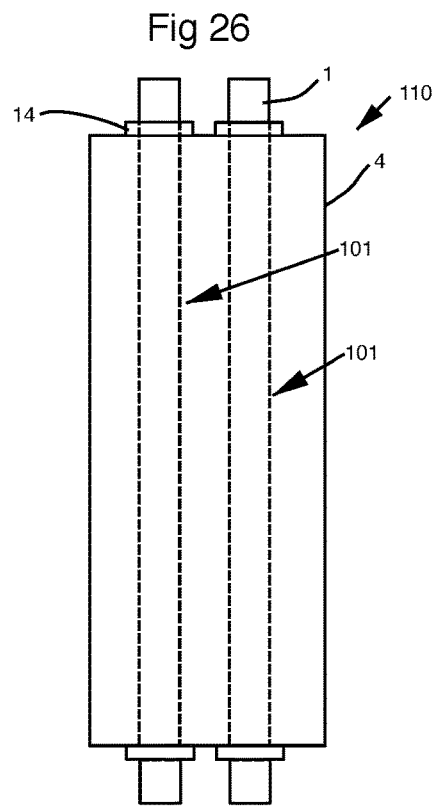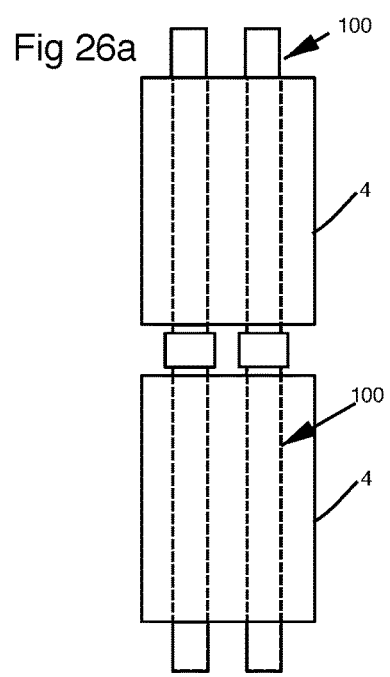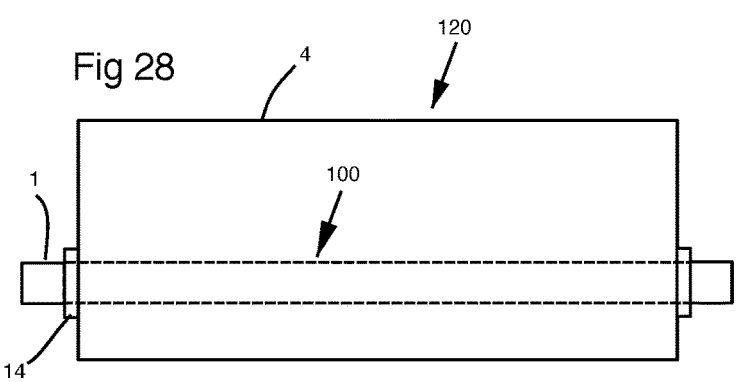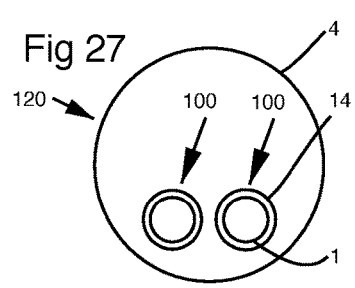

HEAT EXCHANGERS THAT SAVE ENERGY BY HEAT EXCHANGE BETWEEN A FRESH LIQUID AND WASTE FLUIDS

FIELD OF THE INVENTION

The field is heat exchangers that save energy by heat exchange between a fresh liquid and waste fluids.

BACKGROUND OF THE INVENTION

Current drainpipe heat exchangers only work in the 'continuous flow mode' when fresh water is being used and drained so both flow through the exchanger at the same time. They don't work in 'batch flow mode' where fresh water is used and drained separately, such as in wash machines, tubs, clothes dryers, furnace exhausts and the like. This is because they can't store heat between the fill-drain cycles. The instant invention uses a tank of the fresh water to overcome this problem and is thereby able to exchange more heat with the fresh water. Therefore a great deal of heat energy continues to be wasted adding to global warming and pollution.

Hygienic hot water is unique in that, in any given time zone, its use peaks at certain narrow times-of-day: morning, mid-day and evening at which times millions of water heaters are 'on' all together until 'turn off' temperature is reached. Heated electrically requires expensive peak power and related transmission losses and. If heated with fuel, the heaters simultaneously release huge volumes of moist acidic exhaust fumes that form unhealthy smog in cities and environmental degradation.

With the instant invention, heaters turn 'off' faster resulting in fewer being 'on' together which lowers those negatives.

SUMMARY OF THE INVENTION

Using hot water as the example, the instant apparatus preferentially heats fresh cold water with waste fluid no matter their temperature. The apparatus has a water tank pressurized with the fresh water and an outlet connected to a water dispenser such as a water heater or faucet(s). Passing through and sealed to the ends of the tank is a tubular plastic housing with a central drainpipe connected into a building's drainage and/or venting system. Drainpipe can have a surrounding slit sleeve for double-wall safety.

A compressible gasket between drainpipe and housing creates an annular water conduit. One end of the housing extends past the tank and has a cold water inlet to the conduit.

To only heat the tank water or said otherwise, to preferentially temper it, the conduit has a rows of holes into the tank which are opened or closed by flap valves which move by the force or current of convection, also called mass transfer. Convection in any fluid results from changes in density, in this case, between tank water and conduit water. A warmer drainpipe heats and lowers water density in the conduit. Colder denser tank water pushes valves open to enter conduit, get heated by the drainpipe/sleeve rise upwards into tank. A colder drainpipe densifies conduit water which closes the valves to prevent it escaping into- and cooling the tank thereby providing preferential tempering. During continuous flows the valves are closed by forced convection flow through the conduit forcing the incoming water to travel the full length of the warmer drainpipe for maximum heat exchange and enter the tank through an unvalved upper hole.

To preferentially cool the tank to feed, for example, a chiller or drink fountain, the setup is reversed with valves located outside the conduit, water inlet above, and conduit and tank outlets located low.

BRIEF DESCRIPTION OF THE DRAWINGS

FIG. 1 is a cross section end view (at 1-1, FIG. 2) of the vertical embodiment showing the concentric arrangement of the drainpipe, sleeve, housing, tank, compressed O-ring gasket, tank water outlet, and one embodiment of a valve body with flap valves;

FIG. 2 is a side view of the same embodiment showing the lower water inlet in the housing below the tank, and the upper outlet from the tank. Only two convection holes are shown. Flap valves are not shown so as to more clearly show the other components;

FIG. 2a shows the same embodiment with domed end caps to resist bursting. A grommet seals the end caps to the housing. Optional tie rods are shown to reinforce the end caps. Extensions to the tie rods can serve as support legs;

FIG. 2b shows how multiple tie rods can be added internally to allow simpler flat end caps;

FIG. 5 is an exploded perspective of a horizontal housing with its convection holes, and with valve assembly below. At the lower left of the figure is shown a U-shaped line representing a seal for use against housing end to prevent cold water leakage from conduit;

FIG. 5a details how the gasket and optional compensator are positioned for insertion of the copper drainpipe and sleeve. The housing can be squeezed to an oval to provide added slide-in clearance between them for the drainpipe;

FIG. 6 shows a segmented and concave flap valve of thin plastic such as polyethylene with the dotted holes representing the holes in the housing against which each valve segment seals;

FIG. 7 shows a side view from the compensator side. Upper outlets in the housing are not valved. Multiple lower inlets are shown for inlet flow distribution. Valve channel rubber clamp bands are also shown;

FIG. 8 is the same embodiment from the gasket side with single lower inlet;

FIG. 9 shows an end view of the heat exchanger's housing squeezed narrower and taller (oval) for assembly clearance. A removable alignment strip is shown between parallel gasket runs on each side of slit. Also show is full length gasket alignment bar which can be permanently bonded to inside of housing;

FIG. 9a shows the same embodiment un-squeezed that results in gasket/compensator compression. Compensator end loops are shown pinned to prevent movement during assembly after which they can be cut flush;

FIG. 10 is a perspective of the end of alignment tool for slip and gasket being a notched strip and a tapered expansion plug with slots to slide onto the strip;

FIG. 11 shows an enlarged side view of the sleeve and gasket in operational relationship. Vents (grooves) on left side are longitudinal and circumferential on right;

FIG. 11a shows a three piece gasket alignment jig. Two bent wire rods slide into the ends of a tube and engage the ends of the slit in the sleeve to hold gasket runs in position away from the slit until compressed during assembly;

FIG. 12 shows in a close-up of a portion of FIG. 11 how the circumferential vents terminate through the slit's flanges to leave them open to the gap and therefore to the ambient for leak detection;

FIG. 13 shows in perspective how the one-piece gasket has looped ends and straight runs that co-contact the margins and paths on the housing inner surface and the drainpipe (or copper sleeve) to form a sealed conduit with inlet and outlet;

FIG. 14 shows ways in which holes at the bend line of the flange intersect the vents, and how the gasket contact path is clear of such features (only one flange is shown);

FIG. 15 is the same as FIG. 14 with the flange now bent showing how any leakage picked up by the vents can flow into and along the slit between the flanges and then out either end of the housing to the ambient where the leak is revealed as a drip;

FIG. 16 shows a cross-section of a manifold in two configurations. The upper configuration is machined and bonded to the end cap of the tank (or all made in one piece) and doubles as a reinforcement against burst pressure. It has a single groove for an O-ring to seal with the housing and lies adjacent the flow distribution groove. The lower configuration shows O-rings seals on each side of the flow distribution groove. Both configurations incorporate an inlet fitting. Also shown are blocking means to prevent water pressure from pushing the gasket's end loop out;

FIG. 19 shows the heat exchanger with a waste stream inlet fitting that accepts different streams of waste fluid such as drainwater, warm rain, gaseous waster from clothes dryer exhaust, water heater exhaust, or other sources. Also shown is a back flow preventer or check flap valve to control odour. Also shown is a vent to the outdoors for final gaseous exhaust;

FIG. 19a shows another typical back flow preventer where a pre-moulded cuff of rubber has its outlet end curled and closed when there is no flow and so prevents back flow but uncurls into a straight tube by blown gaseous waste or exhausts;

FIG. 20 is a side view showing how the tank can be built from components that are welded/bonded to the housing to resist bursting from water pressure;

FIG. 21 shows an alternative and simpler flap valve arrangement without a valve channel where one flap is clamped in place between the housing (not shown) and gasket, and a second flap between housing and compensator;

FIG. 21a is another arrangement where two spaced apart compensators each clamp a flap valve beneath;

FIG. 22 is an cross section end view through convection holes in the housing showing how the flap valve 'hinges' are clamped by the compensator leaving their outer wings free to move with convection currents. The left flap valve is shown open to allow inbound convection while the right side flap valve is shown closed as would happen when cold waste fluid flows; Also shown is how the housing can be extruded with an alignment protrusion to space the gasket's straight runs;

FIG. 22a shows how the vertical embodiment can use the compensators to hold flap valves that serve multiple housing convection holes;

FIG. 23 shows a plan view of a flap valve having wide separations between the flaps to allow individual flap movement in response to varying density along the height and also provide convection currents with a shorter flow path;

FIG. 24 shows a side view of the device showing how pumped drainwater from wash machines can also be inputted. A vertical format is shown that occupies less floor space which could be advantageous in some settings;

FIG. 25 shows a topside view of a vertical embodiment with multiple heat exchangers in a single tank;

FIG. 26 is the same embodiment in phantom view;

FIG. 26a is a side phantom view of a tandem or series arrangement of two of the units shown in FIG. 26;

FIG. 27 shows an end view of a horizontal embodiment with multiple heat exchangers in a single tank;

FIG. 28 shows a phantom side view of the same embodiment.

DETAILED DESCRIPTION OF THE INVENTION

Figure 3:
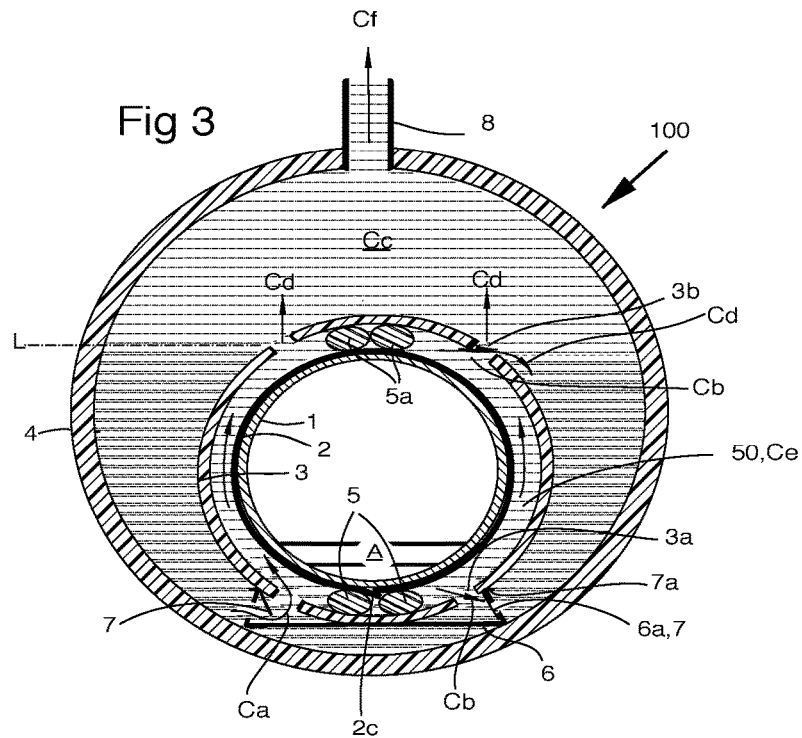
FIG. 3 is a section end view (at 3-3, FIG. 4) of the horizontal embodiment. A single flap valve assembly is positioned as low as possible to be in the coldest strata. The bottom edges of the upper outlet holes are flush (or higher) with the top of copper drainpipe to prevent cold water overflow from a cold conduit resulting from a cold drainpipe carrying cold drainwater.

The following description should not be used to limit the scope of the present invention. Other examples, features, aspects, embodiments, and advantages of the invention will become apparent to those skilled in the art from the following description. It should therefore be understood that the inventor contemplates a variety of embodiments that are not explicitly disclosed herein. Its use in a hygienic hot water system will be derailed herein.

Hygienic hot water flows can be of two types:
1. continuous flow as in showering when hot water and drainwater flow simultaneously or
2. batch flow as in a wash machine where an appliance 400 fills and cleans for a time with no draining, and then drains for a time with no cold water flow.

Drainpipe heat exchangers for continuous flow have long been commercially available. The instant invention is the only known heat exchanger that recovers and stores recovered heat from both continuous and batch flows, regardless of the varying temperature, volume and times-of-flow of the waste fluid. It preferentially only heats the cold water supply for a water heater or faucet. It operates automatically, needs no power. Its high performance ensures widespread societal benefits.

Apparatus 100 on ground G has pressure tank 4 with a drainpipe heat exchanger 200 extending through it. It is plumbed into a drainage system and into a supply of fresh water C. Tank 4 supplies pre-tempered water from outlet 8 to a tempering appliance 400 on ground G.

Exchanger 200 pre-tempers or pre-heats water C for appliance 400 by forced convection when in continuous flow mode, and by natural convection when in batch flow mode.

If its waste heat that is being recovered and stored in the tank 4 it follows that cold drainwater must not be allowed to cool it. This inventive feature is achieved as follows.

Heat exchanger 200 has a thermally conductive drainpipe 1 (i.e., copper) whose central portion is enclosed in a larger cylindrical plastic housing 3 sealed to each end of tank 4 and has annular space 50. Housing has openings 3a, 3c into tank 4. One end of housing 3 extends beyond tank 4 to include water inlet 9. Drainpipe ends 1a extend beyond each end of housing 3 for plumbing connection.

Sleeve 2 has slit 2a open to the ambient for leak detection. Sleeve 2 is thermally conductive and surrounds central portion of drainpipe 1 providing double wall protection from cross-contamination. Sleeve 2 also has vent grooves 20 whose ends open to the ambient also for visual leak detection.

One-piece compressible gasket 5 circumscribes annular space 50 including inlet 9 thereby creating conduit 50 for water to flow through adjacent sleeve 2 and into tank 4.

Conduit 50 has outlet 3c inside tank 4. Tank is therefore filled via inlet 9. Pre-tempered water Cc exits tank 4 through outlet 8 into appliance 400. Pre-tempered water Cc can also feed piping, fixtures and faucets in a building.

Holes 3a in housing 3 allows water Ce in conduit 50 to naturally convect with water Cc in tank 4. The direction of convection through holes 3a is determined by the relative temperatures of water Ce and Cc. Holes 3a have associated floating (buoyant, frictionless) flap valve(s) 7 that move with convection currents Ca, Cb, Cd to cover or uncover holes 3a. If the drainwater A is cold then the small volume of cooled water Ce inside conduit 50 would convect outward (cold water is heavier). However such cold convection currents Ca push valves 7 to close holes 3a (top portion of FIG. 1) so that cooled water is locked in conduit 50 thereby preventing the unwanted cooling of water Cc in tank 4.

(FIG. 1 shows valves 7 at top and bottom portions of the Fig as working oppositely. This is just for description purposes. In operation valves 7 are pushed open or closed.) With a warmer drainwater A the opposite convection flow occurs. Colder and heavier tank water Cc push valves 7 open to enter conduit 50 where it is heated to be lighter and is therefore displaced upwards into tank 4, by surrounding colder water, where it is temporarily storage until demanded by someones use of tempered water from appliance 400.

For continuous hot water use, forced convection occurs whereby the valves 7 are force-closed by pressure in conduit 50 ensuring the continuous incoming cold water has to flow the full length of conduit 50 for maximum heat exchange with concurrently flowing warmer drainwater A which continuously heats drainpipe 1 and sleeve 2. Pre-tempered water Ce whereafter it exits Cd into tank at upper outlet 3c (FIG. 2). This forces tank water Cf out of its outlet 8 when pressure is released by tempered (hot) water is drawn from appliance 400.

For batch hot water use, such as filling a wash machine, there is no concurrent freshwater/drainwater flow so no heat is exchanged in exchanger 200 and it is previously heated water Cc stored in the tank that feeds the appliance.

When only hot drainwater is flowing, free convection again occurs where the colder, denser water in the tank push the valves open to travel upwards in conduit 50, be heated by the warmer sleeve 2, and exit as pre-tempered water Cc into the tank 4.

When only cold drainwater is flowing, the small volume of water in the conduit immediately becomes colder and heavier and pushes the flap valves closed preventing it from leaving and cooling the tank water. This preserves the stored thermal energy.

For heat rejection (pre-cooling for a chiller) the flap valves are on the outside of the housing and the tank outlet at the bottom so as to operate in reverse with the tank being advantageously cooled by colder, heavier drainwater. Such a scenario would benefit food operations where refrigerated water is essential to cool and rinse food stuffs, and for ice makers, drink fountains and the like.

Also by way of background, the thermal performance of a fluid-fluid heat exchanger is its rate of heat transfer $Q=(\Delta T*A*T)/R$ where, temperature differential ($\Delta T$), thermal resistance (R) through the wall separating the fluids, wetted area (A) and time (T).

turbulence at the wall also has an effect, more being better. Turbulence adds to (Q) by dislodging the boundary laminar layers of fluid that naturally form adjacent any surface (sleeve 2) and which add (R).

Heat transfer (Q) between contacting surfaces of drainpipe 1 and sleeve 2 is further governed by contact pressure which in the instant invention is applied by the supply water pressure in tank 4 and conduit 50 which continuously constricts sleeve 2 around drainpipe 1 which is allowed by slit 2a which is thereby narrowed.

The device has vertical and horizontal embodiments. The flow characteristics in the heat exchanger are different in each.

For the vertical, drainwater flows by what is referred to as 'a falling film' where the entire inner surface (A) of the drainpipe naturally becomes circumferentially wetted with a thin, slow falling film of the descending drainwater and the entire surface transfers heat somewhat evenly. Gaseous flow has no such flow characteristic and is generally chaotic but also evenly distributed. The length of the vertical embodiment is generally limited by floor to ceiling dimension. Multiple units in parallel can be installed for more heat recovery.

For the horizontal, drainwater flows trough-like in the lower portion of the drainpipe which is the only portion wetted and and where most heat is transferred. Heat conduction through the wall of the drainpipe therefore provides less heat transfer. Gaseous flows can contact the entire tube wall in places. To its advantage, length is only limited by floor size and parallel units can be installed to provide virtually unlimited area (A).

In both embodiments multiple units can be joined in series and/or in parallel to achieve greater savings.

There are two major components to the instant device: the tank and the heat exchanger. and are described separately.

First the Tank.

In all figures tank 4 is a 'pressure retention vessel' of plastic, metal or fibreglass or in combination, such as a plastic liner in a steel sleeve. A water outlet 8 connects to an end use (appliance, faucet, radiator). The tank can be left uncovered in heating season to act as an air heater reducing energy use.

Each end 12, 12a of tank 4 is capped and the caps each have at least one large hole 92a for housing 3 to seal through. In the vertical design the holes 92a are on centre while in the horizontal the holes 92a are best offset towards the bottom where the colder tank water Cc will always collect and therefore yield the fastest heat transfer due to the ΔT.

Several methods can be used to make the tank 4 both burst proof and low cost. One is a water pressure regulator 9b at inlet 9.

Another is to bond the end caps 12, 12a to the tube and to bond reinforcement plates 14 to the end caps. Plates 14 have O-ring(s) 13 within to seal against outer housing 3 of the heat exchanger 100, 101.

A second method is the use of a one-piece domed-end cylinder shown in FIG. 20 with a sealing grommet 92 (FIGS. 2a, 2b) fitted in the hole 92a.

A third method uses well known tie rods 90 and tie plates 91 as shown in FIG. 2a. The rods 90 can be internal as in FIG. 2b and extend through the end caps 12, 12a with suitable external leakproof fasteners such as rubber-faced washer or rubber sleeves running full length and to the outside where they are flared and compressed by washers and nuts. Tie rods 90 can include extension legs 90a to support the vertical device (FIG. 2a, 2b).

A fourth method is shown in FIG. 20 where the tubular housing 3 of the heat exchanger does double duty as a tie rod by plastic welding and/or adhesive bonding 60 the end caps 12, 12a to the housing (and to tank 4) at positions indicated by joint 220. This transfers bulging/bursting forces on the caps to a tensile load on the housing which can easily resist it.

Figure 4:
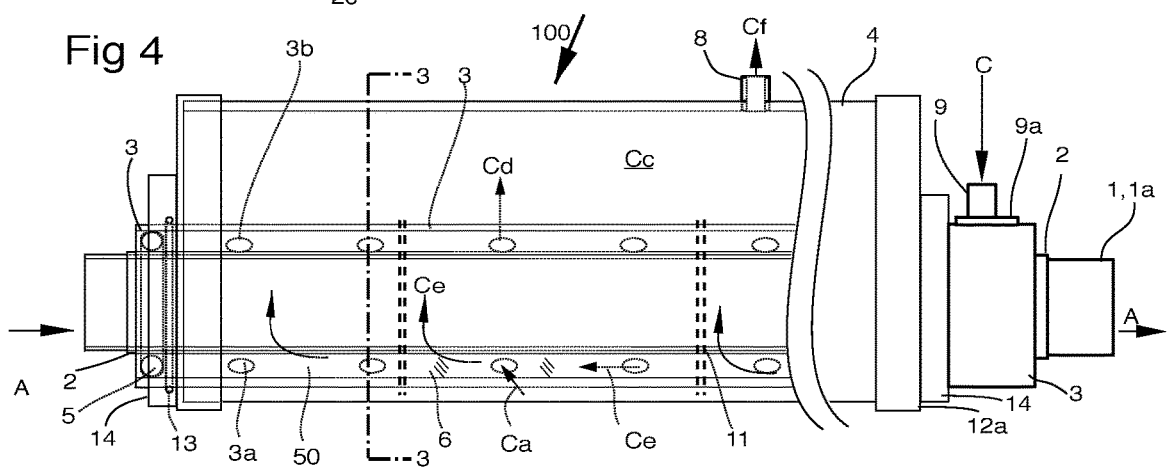
FIG. 4 is a side view of the same embodiment showing the water inlet on the right end of the housing and the horizontal water flow from right to left and up along the drainpipe sleeve through which drainwater counterflows left to right.
Figure 4A:
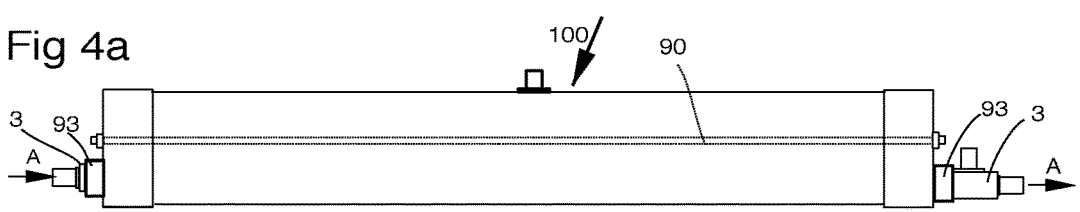
FIG. 4a shows an internal tie rod on centre for maximum end cap strength. Reinforcing rings bonded/secured to the housing are also detailed.

A fifth method is shown in FIG. 4a where band or ring retainers 93 are bonded to housing 3 outside of the end caps at each end to transfer tensile loads to housing 3 as in a tie rod. Retainers 93 may also be metal clamps or 'push-on' toothed fasteners for smaller diameters. Manifolds 70, 80 may also be bonded/welded to housing 3 at the inlet end for the same purpose.

A sixth method is to solder bosses 94 (FIG. 2b) to the drainpipe end stubs to receive the water pressure force from retainers 93 turning the drainpipe into a huge tie rod. Rolling protrusion bosses 94 (FIG. 2) in the wall of each drainpipe stubs 1a can accomplish the same restraining boss function without the complexity of soldering separate components together. Outlet 8 in the tank wall is positioned near the top for pre-temper heating and near the bottom for pre-temper cooling.

Second, the Heat Exchanger

Heat exchanger 100 in FIGS. 3,4, 4a is for horizontal installation and 101 FIGS. 1, 2, 2a, 2b is for vertical. Each has multiple elements: drainpipe, sleeve, housing, gasket, compensator, valving, and manifolds.

Drainpipe

Drainpipe 1 is straight and round and can be of any diameter, usually the same as available drainage drainpipe (1, 1½, 2, 3, 4, 6") and it is longer than the tank so that its ends are exposed as stubs 1a which are of sufficient length for standard plumbing connections.

Sleeve Optional sleeve 2 is a pinch-rolled sheet copper cylinder with a thickness such as 0.020 to 0.060 inch (0.5-1.5 mm) and fits tightly around drainpipe 1. Sleeve 2 is shorter than drainpipe 1 and has a full length slit 2a. Sleeve 2 may have flanges 2b along one or both edges of slit 2a, to separate the straight runs 5d of gasket 5 from crossing over slit 2 which would cause a leak. In FIGS. 10, 11, 12 14, 15 sleeve 2 is shown with vents 20. Vents 20 have a rounded profile for gasket conformity. Vents 20 are straight, extend full length and are open at each end. Circumferential vents 22 begin and end at slit 2a. The two may be combined into a cross-hatch pattern.

Flanges 2b and vents 20, 21 should have intersecting vias 22, 22b, 22c (FIGS. 12, 14, 15) to ensure that vents are not crushed or otherwise blocked in forming the flanges. Different configurations of vias are shown in FIG. 14,15 including a hole 22b, slot 22 and vee notch 22c. FIGS. 14 and 15 show paths 5h onto which straight gasket will be compressed. Separate alignment rod 3k or protrusion 3j (FIG. 22) integrally extruded with housing 3 serve this same purpose as bent up flanges.

Another method of providing vents is to emboss grooves 30 (one shown) into the wall of drainpipe 1 between end stubs 1a. The grooves 30 could be formed along the entire drainpipe 1 after which the end stub regions 1a could be reformed to the round. Yet another method is to form flats 31 (one shown) along the outer wall of drainpipe 1 between stubs 1a. Such flats are easily filed, scraped or milled along the tube wall. The grooves 30 and flats 31 can extend over stubs 1a if a seal between stubs 1a and the plumbing connection (P in FIG. 16) can be guaranteed such as by the use of a rubber coupling and/or a sealant between. Insulating sleeve 3p shown in FIG. 2 reduces a possible small heat loss by 'lateral' convection through exit 3c when drainpipe 1 is colder that tank water Cc.

Housing

Housing 3 is a plastic tube shorter than drainpipe 1 but larger in diameter so as to create an annular conduit 50. One end of housing 3 extents far enough to accommodate water inlet 9 and reinforcement plate 9a or manifold 70, 80.

Along the housing's length are holes 3a and associated flap valve 7 to control convection therethrough. One or more unvalved outlet holes 3c are have the highest possible placement. Horizontal housing 3 has outlets 3b. Housing 3 can also have purposeful holes 3d (FIG. 7) to secure any compensator 5a, although the inlet 9 and outlet 3c can be used. FIG. 8 shows the side view from gasket side and where a single inlet 9 is used on the compensator side where there is no obstruction to flow of fresh water C into conduit 50.

A channel-shaped flap valve duct 6 bridges across the rows of holes 3a. It has holes 6a in its side wall(s). Rubber bands 11 can be used to secure duct 6 to housing 3 and to clamp flap valve 7 in between.

Housing 3 can have its rims chamfered 3' (FIG. 16) for ease of assembly of gasket loops 5e. The rims of housing 3 can have gasket positioning marks 3h diametrically opposite compensator 5a. A separator bar 3k (FIG. 9) of plastic or metal can be bonded inside housing 3 to separate the gasket straight runs 5d at mark 3k to prevent gasket movement and serve as a limiter to prevent over compression of gasket 5.

Gasket Gasket 5 can be an elongated O-ring of a water-safe elastomer such as Nitrile or EPDM. It gets shaped on assembly as shown in FIG. 13. Gasket 5 encircles both ends of the drainpipe with loops 5e that are connected by parallel straight runs 5d. Its linear length is approximately equal to two drainpipe circumferences and two drainpipe lengths. Two or more gaskets 5 could be used for redundancy. Gasket 5 is compressed on assembly.

Gasket 5 can be used to clamp flap valve 7 as shown in FIGS. 21,21a, 22. In FIG. 5a the gasket 5 and compensator 5a are shown in position for the insertion of drainpipe 1. Gasket 5 is placed in housing 3 and pulled back (stretched slightly) on the outside and held there with hooked-end wire H. In this way parallel runs 5e are held taunt and aligned with index mark 3h (FIG. 9) at each end.

Compensator Compensator 5a can be made from the same O-ring material as gasket 5 or be a solid having a height equal to the calculated compressed thickness of gasket 5. It is pulled into a linear form such that the ends can be passed through holes 3*d* (or inlet-outlet holes 8, 9) and held there by pins 5*b*. It does not extend full length so inlet water C is able flow to either side of conduit 50. On assembly the compensator becomes compressed so the pins can be removed and ends snipped off if necessary. FIG. 13 shows two separate compensators that along with the gasket 5 provide three-point self-centring of the drainpipe 1 in the housing 3. FIG. 21*a* shows how the compensator can clamp flap valve 7 in place. FIG. 22 shows the flap valve 7 open on the left side and closed on the right. Of course that cold not happen at the same density strata and is for illustrative purposes only. Also shown in FIG. 22 is how the segmented flap valve 7 with slots 7*c* can be used to reach distant holes 3*a* (on right). The slots 7*c* will allow inflow water Ca (FIG. 1) to reach conduit 50 and all areas of sleeve 2 quickly because currents can flow through the flap valve slots 7*c*. Wide slots are preferable for that reason. Alignment protrusion 3*j* can be extruded or bonded in to simplify assembly.

Manifold

The longer end of the housing 3 of heat exchanger 100, 101 has the fresh water (or other liquid) inlet. It can be a single fitting 9 and can have an associated reinforcing pad 9*a* (FIG. 2). In FIG. 16 two designs of a manifold are shown in cross section: manifold 70 above and manifold 80 below. Each manifold design includes a fresh water inlet 9 which intersects an internal circumferential water distribution groove 73.

In FIG. 16 grooves 72 are for O-rings to seal to the groove 73 housing 3. Groove 73 distribute water from fitting 9 all around the housing 3 to multiple inlets 3*f*, 3*g* which open into heat transfer conduit 50. Lower manifold 80 has dual O-rings 13 designed to allow it to be slid on from the end of housing 3. Manifold 70 has a single O-ring 13 and is intended to be one-piece with end cap 12*a* and so dispenses with reinforcing plate 14. Lower manifold 80 is shown to have an outer flange 71 as one method to retain O-ring 5 against internal water pressure, and also shows another method of a flared end 2*f* (or tabs, not shown) on rim of sleeve 2. A third method shown is to bond a retaining ring 2*j* into housing adjacent gasket loop 5*e*. Yet another method is to use the plumbing connection adaptor P, commonly a thick rubber coupling with steel gear band clamps (only top half shown) that tightens around stub 2*a*, to butt against end of housing 3 or trap a spacer ring 2*k* against the gasket loop 5*e*. Inlets 3*f* and 3*g* are shown enlarged in FIG. 16 to be different with inlets 3*g* (top, FIG. 16) being perpendicular while the 3*g* inlets (below) are angled outwards to direct water C against gasket 5 to prevent possible erosion of the copper from hard water jetted directly against it. For the same reason, inlets 3*g* are positioned such that water C is deflected away from the copper sleeve 2 or drainpipe 1.

FIG. 16 also shows turbulator 35 such as a screen or mesh inserted in conduit 50 to enhance heat transfer by creating turbulent conduit flow Ce.

Valve Flap valves 7 shown in FIGS. 5,6, and 21-23 are made from strips of thin flexible material with water-like density such as polyethylene or polypropylene, suitable for permanent immersion in water and with a density similar to that of water so as to move as freely as possible. This is more important in the horizontal embodiment where a heavy flap valve 7 would sink against the holes 3*a* and require too much free convection current force to open. One edge of the strip is free to float in the water and so is friction-free and readily moved by convection currents inflow Ca and outflow currents Cb (FIGS. 1,3).

A preferred flap valve embodiment, particularly for the vertical device, is shown in FIGS. 6 and 23 is a segmented flap valve 77 with spaces 7*c* that define individual valves for each inflow 3*a* (represented in dotted outline). Segmented valves 77 are able to open and close holes 3*a* independently and automatically to optimize convective flow at each density strata. This is more important for the vertical exchanger 101 where strata develop over a considerable vertical height and so the range of densities will be more that in the horizontal. The segmented flap valve allows for tailored openings-and-closings inside and outside of housing 3 all along its height based on relative densities to maximize performance.

FIG. 23 shows how one line of larger holes can have a flap valve 77 held in place with a strap 7*e* that locks in holes 7*f* in housing 2, and/or is inserted through holes 7*m* in flap valve 7 or 77 and then through housing 3. If strap 7*e* is plastic it can be melt-rivet-ended on the outside of housing 3 in a countersunk hole (not shown) and then levelled so that a smooth exterior is maintained for safe entry through end seals 13. FIG. 23 also shows slots 7*c* widened to the maximum to provide unhindered access for inflow water Ca from below flap valve 7 into conduit 50.

Valve Attachment

FIGS. 1,2 and 3, 4 show how channel shaped flap valve ducts 6 have side holes 6*a* for valves 7. Ducts 6 are clamped to the sides of housing 3 with elastomeric bands 11 trapping a margin of the flap valve 7 between. This leaves the remainder of the flap valve 7 free floating and easily moved by convection. FIG. 1 shows two flap valve ducts 6 along each side of vertical housing 3 and bridging holes 3*a*, while FIG. 3 shows a single flap valve duct 6 horizontally along the bottom also bridging holes 3*a*. Valves 7 attached by ducts 6 can have a longitudinal hem portion 7*a* to locate on the clamping edge of duct 6 for added security during assembly.

Ducts 6 contact and preferably are sealed 7*d* (FIG. 5) to end caps 12, 12*a* to prevent leakage from conduit 50 when conduit water Ce is cold.

In another embodiment flap valve(s) 7 or 77 can be internal. They can be attached inside the housing as shown in FIGS. 21-22 such as by trapping them under the compensator(s). Valve 7 or 77 may also be trapped under gasket 5 as shown in FIG. 21 if thin enough so as to not prevent the gasket from making an effective seal where it runs off the ridge of the flap valve material at each end. FIG. 22*a* shows in the vertical device how two compensators 5*a* can be spread apart and used to spread apart the flap valves 7 or 77 to reach further around the wall of housing 3 to inflow holes 3*a*. Of course if spread too far apart they will prevent squeezing the housing for assembly as detailed later.

In another embodiment flap valve 7*b* in the upper part of channel 6 in the lower part of FIG. 5 is a free floating strip that is made of a slightly stiffer material to maintain flatness/straightness and ensure a good seal against holes 6*a* when closed by convection currents. The strip, duct dimensions and shape are cooperatively arranged to provide just-sufficient movement without the possibility of the flap valve jamming open or closed. In the vertical embodiment, because it will sink or float thereby contacting an end cap, it can be designed to 'hinge' or pivot from its contacting end instead of from along its length.

Assembly—Heat Exchanger

Where the sleeve 2 has no flanges the gasket is placed through housing 3 with gasket runs 5*d* on each side of rim index marks 3*h* (FIG. 9) and/or on each and of spacer rod 3*k* shown in FIGS. 8, 9. The outside portions that will become end loops 5*e* are hooked together with wire H (FIG. 5*a*) tensioning the runs 5*d* straight and preventing their accidental movement. The compensator 5a is locked in place with pins 5b (FIG. 7), or by friction in tight holes, tape, bands, or other means.

In a long vise or with clamps, the housing is squeezed (FIG. 9) into a slight oval/ellipse to increase the vertical space between the gasket and compensator which will allow the smaller drainpipe 1 (with or without sleeve 2) to slide freely through the housing and not dislodge the gasket 5 or compensator 5a. After aligning the slit 2a between gasket runs 5d and index marks 3h, the vise is opened whereby the housing's considerable spring-back force returns it to round compressing the gasket and compensator against the drainpipe 1 locking them in place.

The gasket runs 5d are verified to be on each side of gap 2a in sleeve 2 and centred on index marks 3h on each rim. A spacer rod 3k shown in FIG. 8, 9 can be inserted between gasket runs 5d to add spacing if required. It can be removed or left in place as a spacer to prevent over compression and movement of gasket runs 5d. When pressurized with water, the long sides of the ellipse will tend to round out resulting in further gasket compression to the design goal of about 20% of its initial size (varying with gasket composition and size). Additional compression force can be supplied by clamp structures 3m as shown in dotted outline in FIG. 9a.

Hook H can be removed allowing the dangling loops 5e to be stretched around the stub ends 1a of the sleeve/drainpipe assembly. Press dies at each end allow a clamp/press to force the loops 5e into their compressed positions in housing. Lubricant such as soap or K-Y Jelly® will ease their sliding-compression. The ends of the housing 3 can have a chamfer 3' (FIG. 16) to further assist insertion.

Another method for un-flanged sleeves is to have the four corners of slit 2a nipped off as in FIG. 11 to create a locater notches 2c that a straight, stiff wire rod 2d with a bent end can engage. As shown in FIG. 11a two such flanged rods 2d slide snuggly into a plastic tube 2e almost as long as the sleeve 2. The tube 2e will nestle in the slit 2a as wires 2d lock into notches 2c. The gasket 5 will then lie on either side of tube 2e eliminating the possibility of crossing over the slit which would create a leak. The tube can remain in place for added security against gasket movement or be removed after the gasket has been compressed. If used, tapered plug 2h would require clearance notches for the bent end of the wire rod 2d (not shown).

Another assembly method to ensure gasket 5 doesn't move during assembly when there are no flanges on sleeve 2 is to make one vent 20a directly opposite slit 2a. Aligning marks 3h on rims of housing 3 (FIG. 9) can serve to correctly position the ends of gasket. runs 5d. The raised ridge of vent 20a is slid into the grooved space in the compensator 5a (FIG. 9). An alignment strip 2f is inserted with one longitudinal edge sliding in vent 20a and its opposite edge sliding through slit 2a and between straight parallel runs 5d of gasket 5. Alignment strip 2f can have end notches 2g to fit with slots 2i in plug 2h to hold the sleeve 2 tight against straight runs 5d of gasket 5 while its end loops 5e are arranged to encircle the sleeve.

If the sleeve 2 has flanges 2b, the flanged sleeve 2 can be installed first in housing 3 between gasket 5 and compensator 5a. The sleeve 2 is constricted sufficiently (concentrically spiralled) to enable its entry between the gasket and compensator allowing one flange to slide into a space between the parallel straight runs of the gasket. If there are two flanges the second flange is urged into that same space using tapered plugs 2h (FIG. 10) from each end to expand the curled sleeve 2 back to its original round shape. With this method the drainpipe 1 is inserted last where, by design, it expands the sleeve slightly to finally compress gasket 5 and compensator 5a. The compressed gasket 5 then becomes an effective seal.

Assembly—Tank

If the tank is one-piece with the end seals, O-rings or grommets, in place, and the heat exchanger has internal convective valving, then it is simply inserted through one end and out the other. The housing and/or seals can be lubricated to ease entry.

If the tank is to be assembled from tube and end caps, then assembly can follow different paths depending on the flap valve embodiment. With external duct valves and fixed inlet 9, one end cap 12a with plate 14 can be slid over the non-inlet end of the heat exchanger down onto the inlet end. Next the flap valve duct 6 with flap valves 7, 7b, 77 is positioned and secured to housing 3 with bands 11. Next the main tank tube is joined (bonded, welded) to end cap 12a. The second end cap can then be slid over the housing 3 and joined to the tank 1 to complete the assembly.

If the design of the device includes a slide on manifold, then assembly can be as with the one-piece with the manifold being added last.

Reinforcing bands 93 are added when and as required by sliding them over housing 2 with adhesive or welded in place.

Figure 17:
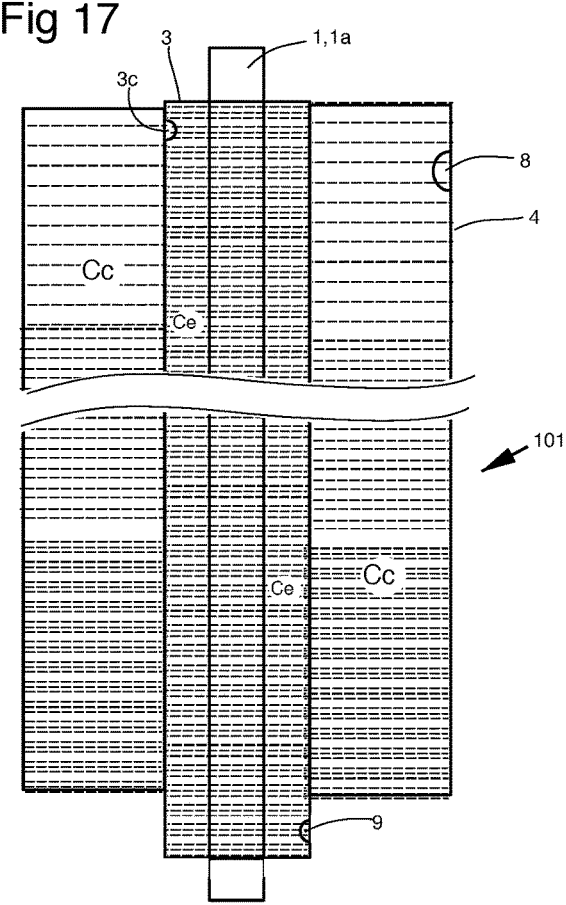
FIG. 17 is a schematic view showing how the water density (warmer, lighter, upper, and, colder, heavier, lower) causes horizontal layers or strata to form at different elevations in the tank and conduit. This effect is due to the convection driven flap valves that prevent a colder, heavier column of water in the conduit from flowing out and cooling the tank.
Figure 18:
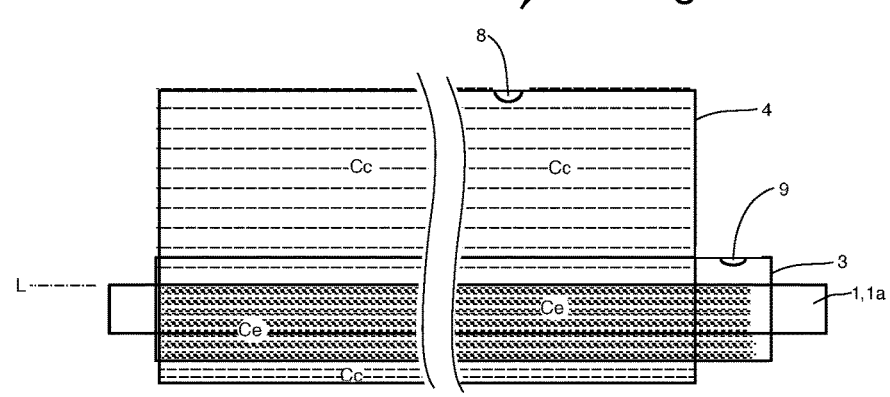
FIG. 18 shows the same temperature/density strata feature but horizontally oriented. Here all unwanted cooling occurs only below the top of the drainpipe/sleeve which, when cold drainwater is flowing, becomes submerged in the coldest layers leaving the stored heat above largely unaffected.

FIGS. 17 and 18 depict the stratification principle in any fluid. The darker areas represent colder, heavier water. In FIG. 17 the housing 3 is filled with cold water Ce from a cold drainpipe 1 and is shown remaining in place because the flap valves have closed holes 6a (not shown) preventing the tall heavy column from pouring out into the tank and cooling it. In FIG. 18 the same holds true except for the space above the drainpipe 1 where the holes 3b (not shown) are at level L just above the drainpipe upper surface. Below that level L cold conduit water Ce stays in place, If outlet holes are too low, it will spill out into the tank.

FIGS. 19,19a and 20 show how different waste streams or flows of liquid A and gaseous B can be fed from different sources into a manifold 200 shown with three inlets to the drainpipe 1. In FIG. 19a for gaseous flows B a check flap valve or back flow preventer flap valve 150 can be used. The gaseous waste from a clothes dryer, a gas water heater or ventilator being fan blown, pushes open flap valve 80 depicted as a lightweight flap. In FIG. 19a the check flap valve 150 is a curled rubber cuff 81 whose mouth 82 automatically curls shut when there is no gas flow and uncurls from fan generated pressure to allow gas flow into the drainpipe. A vent 160 to the outdoors can be used to vent excess gas B' from building up in the sewer drainpipe.

FIG. 20 shows how the tank 4 can be assembled from components weld/bonded at locations 220. Flat end cap 12a bonded at 210 with grommet 92 sealing to hole 92a and housing 3 and reinforcing ring 93 bonded to housing 3 to contain internal pressure. under water pressure the grommet is compressed into a tight seal against the housing 3 and the reinforcing ring 93 and/or boss 94.

FIG. 24 shows how the device can be fed pumped waste liquid A' such as from a washing machine or dishwasher or in a laundromat, where a smaller diameter drain drainpipe 300 connects to manifold 200 along with regular waste streams A, and/or B. Also shown is funnel inlet 250 that encourages liquid flows to spread circumferentially into a falling film as it enters drainpipe 1 thereby making use of its full length for heat transfer.

FIGS. 25 to 28 depict heat exchanger 120 with two exchangers 100, 101 in a common tank 4 where they may have separate or shared waste flows such as one for liquid and one for gaseous waste to maximize heat recovery and where they can be sized for optimum performance.

For chiller applications such as in food preparation, ice making, drinking fountains, where chilled water is required, a waste stream of indeterminate temperature is used to preferentially cool the warmer incoming fresh water. This results in the faster chilling to a final temperature with less new energy use, and a more abundant supply of cold water. In such applications the setup is reversed with the flap valves 7 being outside of conduit 50 to prevent already colder tank water from entering a warmer conduit.

I claim:

1. A heat exchanger for preferentially tempering water comprising: a cylindrical water storage tank having tank ends and a water outlet connected to an apparatus using tempered water; a thermally insulative tubular housing extending longitudinally through the tank; the housing having first and second end portions sealingly extending through the tank ends; the housing having a middle portion within the tank; the middle portion having holes for water to flow through; the middle portion having convection-driven valves associated with the holes configured such that the flow through the holes is in one direction only; a water inlet in the first end portion of the housing and exterior to the tank; the inlet connected to a pressurized water supply; a thermally conductive drainpipe extending through the housing and sealingly extending from the first and second end portions of the housing; the valves configured to open to preferentially temper the water in the tank, or close to prevent unwanted tempering of the water in the tank.

2. The heat exchanger of claim 1 further comprising: a slit sleeve around the middle portion of the drainpipe; the ends of the sleeve sealingly extending through the end portions of the housing; a gasket contacting the housing and circumscribing the ends of the sleeve and along each edge of the slit such that the gasket prevents water in the housing from entering the slit while providing a vent to the ambient for any liquid waste that might leak from the drainpipe.

3. The apparatus of claim 1 where the tempering heats the water in the tank.

4. The apparatus of claim 1 where the tempering cools the water in the tank.

5. The apparatus of claim 2 where the tempering heats the water in the tank.

6. The apparatus of claim 2 where the tempering cools the water in the tank.

* * * * *